United States Patent [19]
Brooks et al.

[11] Patent Number: 5,644,298
[45] Date of Patent: Jul. 1, 1997

[54] DRINKING CONTAINER WITH SERVING COUNTER, AND METHODS OF CONSTRUCTING AND UTILIZING SAME

[76] Inventors: Ruth M. Brooks; Chrystal L. Brooks, both of 9439 Oak St., Taylor, Mich. 48180

[21] Appl. No.: 534,932

[22] Filed: Sep. 28, 1995

[51] Int. Cl.⁶ .................................................. G08B 21/00
[52] U.S. Cl. .................... 340/612; 340/613; 340/309.15; 206/534; D7/509
[58] Field of Search ............................ 340/309.2, 309.15, 340/612, 613; 215/99.5, 100, 230, 365; D7/509, 510, 523, 527, 531; 206/359, 459, 534, 217, 459.5; 116/227

[56] References Cited

U.S. PATENT DOCUMENTS

| | | | |
|---|---|---|---|
| D. 314,689 | 2/1991 | Claudias | D7/509 |
| D. 333,066 | 2/1993 | Kimpson | D7/509 |
| D. 350,457 | 9/1994 | Bailey | D7/509 |
| 675,364 | 5/1901 | Burton | 116/308 |
| 1,049,952 | 1/1913 | Walton | 340/612 |
| 2,323,128 | 6/1943 | Hare | 340/612 |
| 2,931,230 | 4/1960 | Lowery | 215/230 |
| 3,574,957 | 4/1971 | Bello-Bridick | 40/324 |
| 3,818,858 | 6/1974 | Kramer | 215/230 |
| 4,405,045 | 9/1983 | Villa-Real | 206/534 |
| 4,621,670 | 11/1986 | Yuen | 215/365 |
| 4,877,119 | 10/1989 | Hosking | 206/459 |
| 5,242,067 | 9/1993 | Garby et al. | 215/230 |
| 5,269,085 | 12/1993 | Chiapetta et al. | 215/230 |
| 5,536,196 | 7/1996 | Sternberg | 206/217 |

OTHER PUBLICATIONS

Brainstorms Holiday Gift Catalog, 1995 Fall Edition, p. 35, "Mini Water Dispenser".

*Primary Examiner*—Brent A. Swarthout
*Assistant Examiner*—Van T. Trieu
*Attorney, Agent, or Firm*—Weiner, Carrier & Burt, P.C.; William F. Esser; Irivng M. Weiner

[57] ABSTRACT

A drinking container having a serving counter, comprising a vessel for receiving a substantially standard serving of fluid; a serving counter mechanism comprising a ring member which is slidably engaged with the vessel and which includes a series of numbers printed thereon; and a pointing member disposed along the outer surface of the vessel substantially proximally to the ring member and having a corner which indicates a number from the number series corresponding to the number of standard sized servings of fluid which have been consumed over the course of a 24 hour period.

17 Claims, 2 Drawing Sheets

DRINKING CONTAINER WITH SERVING COUNTER, AND METHODS OF CONSTRUCTING AND UTILIZING SAME

BACKGROUND OF THE INVENTION

FIELD OF INVENTION

This invention pertains to a drinking container having a serving counter, and in particular to a drinking container which indicates an amount of fluid which has been consumed throughout a 24 hour period.

The recommended minimum daily amount of fluid and/or water intake is eight ounces eight times per day, amounting to a total of 64 ounces of fluid per day. For people who are significantly large or small, such as obese people or small children, the recommended minimum varies depending upon the person's size and/or weight. In any event, a person often forgets the servings of water and/or fluid which he/she has consumed or fails to accurately determine the amount of water per serving, thereby leading to fluid consumption which fails to meet the recommended daily amount. As a result, the present invention addresses the problems associated with meeting the recommended minimum daily water/fluid amount by allowing for substantially easy recording of fluid consumed.

According to the preferred embodiments of the present invention, there is provided a drinking container having a basin for receiving fluid and a means for indicating a number corresponding to an amount of fluid which has been consumed during a day or other 24 hour period. The indicating means preferably comprises a ring member having a series of numbers printed thereon, and a pointer member for pointing to one number from the number series, the number pointed to representing the number of 8 ounce servings of water/fluid which had been previously consumed in the 24 hour time period. In one preferred embodiment of the present invention, the pointer member is substantially fixed along an outer surface of the basin and the ring member is slidably engaged with the basin substantially proximal to the pointer member so that the number from the number series substantially adjacent the pointer member is the indicated number, i.e., the number of 8 ounce servings which has been consumed.

In use, fluid is deposited in the basin of the present invention until it reaches the 8 ounce mark and/or the height of the ring member. After the fluid in basin is consumed, the ring member is rotated relative to the basin and to the pointer member so that the pointer member points to the correct number of 8 ounce servings consumed. When additional servings of fluid are consumed, the ring member is rotated accordingly in order to update and accurately reflect the amount of servings consumed.

It is an object of the present invention provide a device to quickly, easily and accurately record the number of servings of fluid consumed in a period of time.

It is another object of the present invention to provide such a device which quickly, easily and accurately indicates an amount of fluid comprising a serving.

Another object of the present invention is to provide such a device which is associated with a container for drinking fluid.

Still another object of the present invention is to provide such a device which is simple in design and inexpensive to manufacture.

Other objects, advantages, and salient features of the present invention will become apparent from the following detailed description, which when taken in conjunction with the annexed drawings, discloses the preferred embodiments of the present invention.

DETAILED DESCRIPTION OF THE PREFERRED EMBODIMENTS

Figure 1:
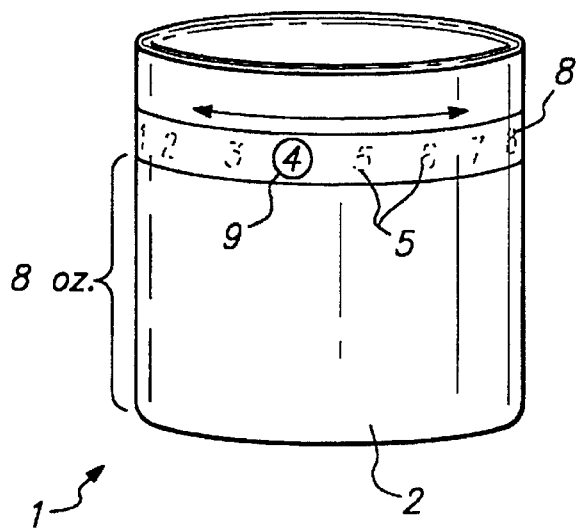
FIG. 1 is a perspective view of a preferred embodiment of the present invention.

Referring to FIGS. 1–4, there is disclosed drinking container 1 comprising reservoir or basin 2, ring member 3, pointer member 4, number series 5, handle 6, and tab members 10. Container 1 is preferably constructed from a relatively lightweight and durable substance and/or composition, such as plastic, aluminum, glass or fiberglass, but alternatively container 1 is constructed from other substances, such as a ceramic or other insulative material.

Basin 2 is suited so that a person drinks fluid directly therefrom. Basin 2 is preferably but not necessarily substantially cylindrical in shape. The height and cross-sectional diameter of basin 2 is suitably sized so that basin 2, when substantially full of fluid, contains a standard sized serving of fluid. In this way, a user may easily consume a standard sized serving of fluid by simply filling basin 2 substantially to the top thereof. In a preferred embodiment of the present invention, basin 2 holds approximately 8 ounces of fluid when substantially full (FIG. 1). Alternatively, basin 2 holds approximately 4, 6, 12 or 16 ounces of fluid when substantially full.

Figure 3:
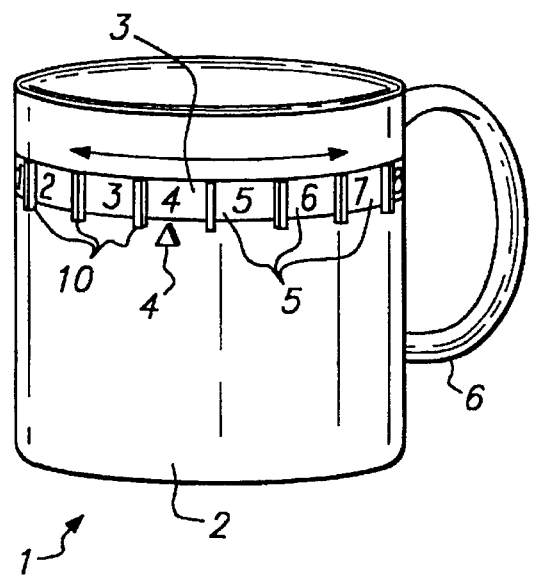
FIG. 3 is a perspective view of another preferred embodiment of the present invention.
Figure 4:
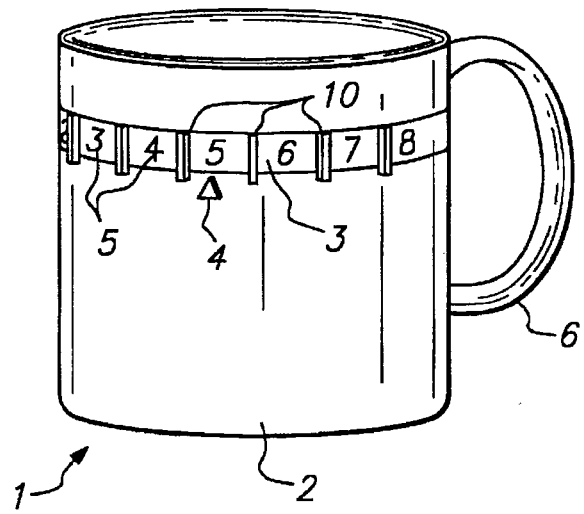
FIG. 4 is another perspective view thereof.

The preferred embodiments of the present invention further include a means for indicating an amount of fluid which has been consumed in a day. Referring to FIGS. 3 and 4, the indicating means preferably but not necessarily comprise ring member 3 and pointer member 4. Ring member 3 preferably includes a series of numbers 5 which are disposed along an outer, exposed surface in substantially numerical order. Number series 5 preferably but not necessarily includes the numbers 0–8 so that the present invention may be used to record the number of consumed 8 ounce servings, 12 ounce servings, or 16 ounce servings of fluid (depending upon the size of basin 2) leading to the 64 ounce daily minimum requirement.

In addition, number series 5 preferably but not necessarily includes the necessary numbers so that any person may use the device regardless of the amount and/or number of standard-sized servings of total daily fluid which that person is recommended to consume. For example, by including numbers greater than eight will allow significantly large individuals to use the device in order to record consumption of more than 64 ounces per day.

In one preferred embodiment, ring member 3 is slidably engaged with basin 2. By way of one example, ring member 3 is comprised of a substantially rigid band having protrusions extending from the upper and lower surface thereof, and basin 2 includes a slot defined substantially circumferentially across its outer surface, having recesses defined along the upper and lower portions of the slot so as to receive the protrusions from ring member 3. In this way, ring 3 is substantially held in place along the surface of basin 2 through the engagement between the protrusions of ring member 3 and the upper and lower recesses of the slot in basin 2. As a result, ring member 3 may be easily manually rotated relative to basin 2 via hand applied pressure.

According to a preferred embodiment of the present invention, pointer member 4 is preferably but not necessarily disposed substantially proximally to ring member 3 on basin 2, having a corner which is directed in the direction of ring member 3, as shown in FIGS. 3 and 4. In this way, ring member 3 may be rotated relative to basin 2 and pointer member 4 so that any number from number series 5 may be selectively positioned substantially adjacent pointer member 4 so as to be indicated thereby.

Figure 2:
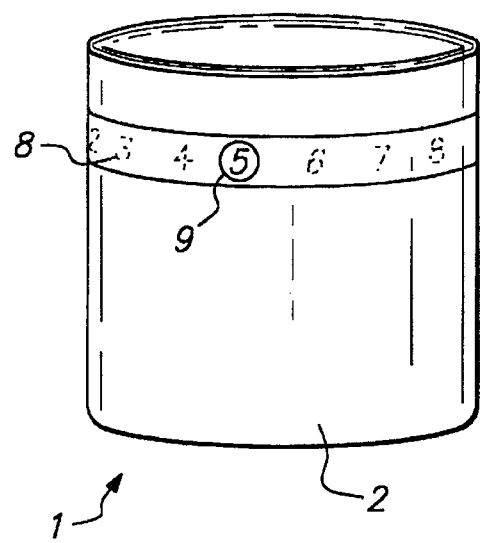
FIG. 2 is another perspective view thereof.

In a second preferred embodiment, the indicating means comprises ring member 3 being integrally formed with basin 2 so as to form a unitary member therewith; and ringshaped pointing member 8 which is slidably engaged with basin 2 substantially over ring member 3, as shown in FIGS. 1 and 2. The sliding engagement between pointing member 3 and basin 2 is substantially similar to the sliding engagement of ring member 3 to basin 2 as discussed in the aforementioned preferred embodiment.

Further, a majority of pointing member 8 is preferably but not necessarily substantially opaque, with a minority portion or window 9 being substantially transparent, as shown in FIGS. 1 and 2. As a result, pointing member 8 may be manually rotated relative to basin 2 and number series 5 so that window 9 is selectively positioned over the desired number thereof so that the desired number is the only number from number series 5 that is visible. FIGS. 1 and 2 show pointer member 8 displaying numbers 4 and 5, respectively, while keeping the remaining numbers in number series 5 (as indicated in dashed lines) from view.

In the preferred embodiments of the present invention, the sliding engagement between pointing member 8 and basin 2 (FIGS. 1 and 2) and between ring member 3 and basin 2 (FIGS. 3 and 4) provide sufficient frictional resistance so that pointer member 8 and ring member 3 are not inadvertently repositioned (thus indicating an inaccurate number of servings of fluid consumed) unless they are manually moved via hand applied pressure.

Alternatively, container 1 includes a second means for substantially preventing ring member 3 from movement until it is manually repositioned to reflect a recent intake of fluid. The preventing means preferably but not necessarily comprises tab members 10, each of which is connected across ring member 3 and extends substantially outwardly therefrom. Each tab member 10 is preferably disposed between adjacent numbers from number series 5 substantially equidistantly therebetween, as shown in FIGS. 3 and 4.

In one embodiment, tab members 10 extend substantially downwardly from ring member 3 so that the lowermost end thereof contacts the upper corner of pointer member 4 when passed thereover. Ring member 3 may therefore be easily manually rotated but the contact between tab members 10 and pointer 4 substantially prevents the accidental repositioning of ring member 3. As a result, pointer 4 indicates an accurate reading of the number of servings of fluid which have been consumed.

In a second embodiment, instead of tab members 10 extending downwardly below ring member 3, the uppermost corner of pointer 4 extends upwardly over the lower portion of ring member 3 so as to contact tab members 10 when ring member 3 is rotated.

According to a preferred embodiment of the present invention, container 1 preferably but not necessarily includes a means for quickly and accurately determining a standard serving of fluid. This allows a person to draw a standard sized serving for consumption without imprecision or delay. Such determining means may preferably comprise ring member 3 being positioned substantially proximal to the opening of basin 2 so that the uppermost edge or lowermost edge or ring member 3 indicates a standard sized serving, such as 8 ounces of fluid, as shown in FIG. 1.

In use, at the start of the day (or other 24 hour period), ring member 3 (or pointing member 8, depending upon the preferred embodiment) is manually rotated so as to indicate the number 0, i.e., the number of standard sized (8 ounce) servings of fluid which has thus far been consumed. Thereafter, each time a standard sized serving is taken, ring member 3 (pointing member 8) is rotated to indicate the correct number corresponding to the up-to-date number of standard sized servings which has been consumed. When not under manual rotation, ring member 3 (pointing member 8) is substantially held in place relative to basin 2 via frictional engagement or tab members 10. When the number 8 is indicated (or other number indicating the number of servings totalling 64 ounces or some other recommended daily total), the minimum daily amount of fluids has been met.

Although there have been described what are at present considered to be the preferred embodiments of the present invention, it will be understood that the invention can be embodied in other specific forms without departing from the spirit or essential characteristics thereof.

For example, it is understood that the present invention may be embodied as a tumbler (FIGS. 1 and 2), a cup (FIGS. 3 and 4), an infant's bottle, or any other container/vessel for drinking fluids.

It is further understood that basin 2 may be sized to receive other standard sized servings of fluid, such as 12 or 16 ounces, in which case less servings will be required to meet the minimum recommended daily amount of fluid and accordingly not all the numbers from number series 5 will be utilized. Alternatively, the standard sized serving of fluid which basin 2 holds may be 4 ounces, in which case a larger number of servings will be required in order to meet the recommended daily minimum.

Figure 6:
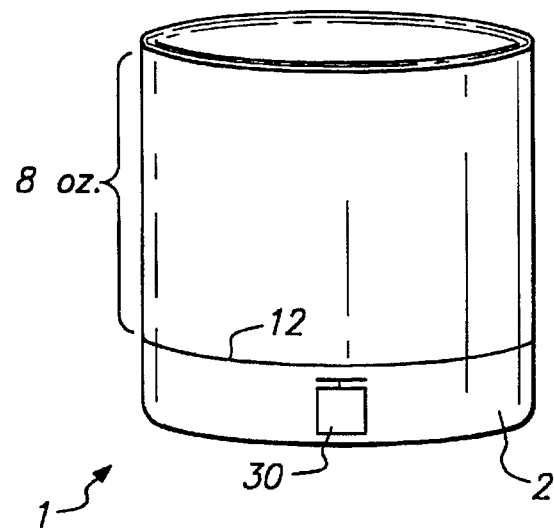
FIG. 6 is a side elevational view of an alternative embodiment of the present invention.

In an alternative embodiment, the present invention includes means for automatically indicating the number of containers of fluid consumed throughout the 24 hour period. By way of one example, such alternative embodiment comprises a sensor 30, such as a pressure sensor, disposed at the bottom of the basin 2 (FIG. 6) so as to generate an electrical signal based upon the amount of fluid therein; means for determining when basin 2 is full of fluid, based upon the signal generated by the sensor 30; and a means for incrementing a number displayed by one each time basin 2 is substantially filled with fluid. The determining means may suitably comprise a comparator 31 which compares the signal generated by the sensor to a predetermined signal value representing a standard sized serving. The incrementing means may suitably comprise a counter circuit 32 which increments its valued stored therein by one, and an electronic numeric display 33, such as a seven segment LED display, which is attached along the outer side of basin 2. This alternative embodiment preferably but not necessarily is battery powered and includes controls for resetting the counter/numeric display 20 and for deactivating the device.

Figure 5:
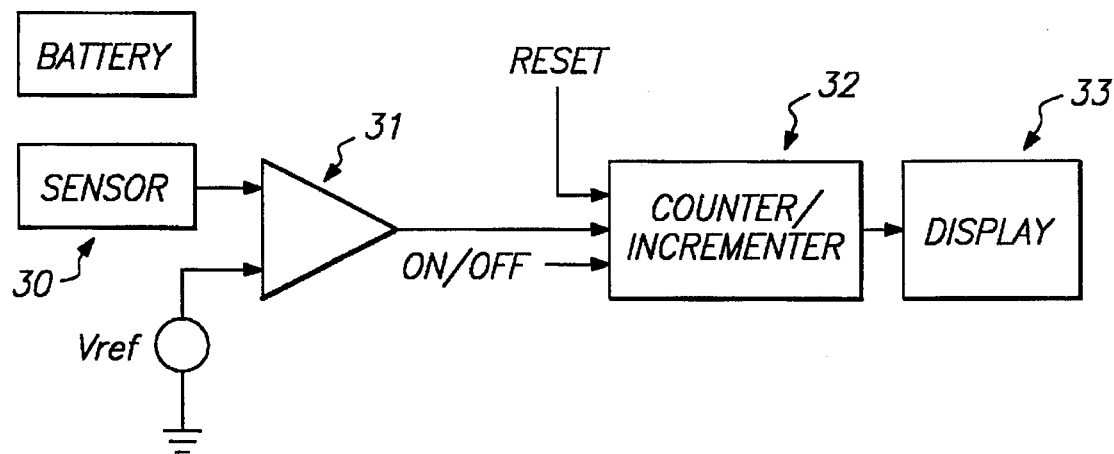
FIG. 5 is a block diagram of an alternative embodiment of the present invention.

One implementation of this alternative embodiment is shown in FIG. 5. It is noted that sensor 30 may be attached to a platform 12 (FIG. 6) or other device which extends substantially fully across the bottom, inner portion of basin 2 so that sensor 30 accurately detects the weight of fluid in basin 2.

As a second alternative embodiment, the determining means and incrementing means not only record and update the displayed number when the sensor detects that basin 2 is substantially full (i.e., when basin 2 holds a standard sized serving), but also record partially filled amounts so that a person will not necessarily be constrained to drinking in 8 ounce increments or other standard increment amount. In this second alternative embodiment, the determining means and incrementing means may suitably include an analog-to-digital circuit and arithmetic circuitry which adds a fractional amount of a standard-sized serving (8 ounces, for example) to the number previously stored in the counter circuit/numeric display. The incrementing means will therefore be capable of storing and displaying fractions of standard sized servings, such as in tenths or quarters of a standard serving, which have been consumed throughout the 24 hour period.

The described embodiments are, therefore, to be considered in all aspects as illustrative, and not restrictive. The scope of the invention is indicated by the appended claims rather than the foregoing description.

We claim:

1. A fluid consumption monitoring device, comprising:
   means for indicating a volume of fluid which has been consumed in a predetermined period of time;
   said indicating means being operably associated with a drinking container;
   said indicating means detects an amount of fluid in said drinking container; and
   said indicating means comprises sensing means for substantially automatically determining when said drinking container contains a serving of fluid, memory means, electrically connected to said sensing means, for storing a number of times when said drinking container contains a serving of fluid during the predetermined period of time, and a means, electrically connected to said memory means, for displaying the number of times that said drinking container contained a serving of fluid during the predetermined period of time.

2. A device as recited in claim 2, wherein:
   said sensing means comprises a pressure sensor.

3. A device as recited in claim 2, wherein:
   said sensing means comprises a sensor which generates an electric signal based upon an amount of fluid in said drinking container, and a means for comparing said electric signal generated by said sensor with a predetermined signal, said predetermined signal representing a standard size serving of fluid.

4. A device as recited in claim 1, wherein:
   said memory means comprises a counter circuit.

5. A device as recited in claim 4, wherein:
   said counter circuit is a resettable counter circuit.

6. A device as recited in claim 1, wherein:
   said display means comprises an electronic display.

7. An apparatus for monitoring the drinking of fluids by a person during a predetermined period of time, comprising:
   means for identifying a volume of fluid consumed during a period of time, said identifying being in increments of a substantially standard size serving of fluid;
   means for displaying said identified volume of fluid;
   said identifying means is suitably connected to a drinking container;
   means for substantially maintaining said display of said identified volume of fluid; and
   said identifying means comprises a sensor which generates an electric signal based upon an amount of fluid in the drinking container, and memory means for receiving said electric signal from said sensor and for storing a value which is based upon said electric signal of said sensor which is generated during said predetermined period of time.

8. A device as recited in claim 7, wherein:
   said identifying means further includes a means, electrically connected to said memory means, for displaying said value stored in said memory means.

9. A device as recited in claim 8, wherein:
   said memory means includes a counter circuit.

10. A device as recited in claim 7, wherein:
    said sensor is a pressure sensor which is disposed along a bottom, inner portion of the drinking container.

11. An apparatus for monitoring the drinking of fluids by a person during a predetermined period of time, comprising:
    means for identifying a volume of fluid consumed during a period of time, said identifying being in increments of a substantially standard size serving of fluid;
    means for displaying said identified volume of fluid;
    said identifying means is suitably connected to a drinking container;
    means for substantially maintaining said display of said identified volume of fluid; and
    said identifying means comprises a sensor which generates an electric signal based upon an amount of fluid in the container, a means for comparing said electric signal to a signal representing a standard size serving of fluid, a means for storing a value based upon said comparison, and a means for displaying said stored value.

12. A fluid consumption monitoring device, comprising:
    means for indicating a volume of fluid which has been consumed in a predetermined period of time;
    said indicating means being operably associated with a drinking container;
    said indicating means detects an amount of fluid in said drinking container; and
    said indicating means comprises a sensing means for substantially automatically sensing an amount of fluid in the drinking container and generating an electric signal in proportion thereto; memory means, electrically connected to said sensing means, for storing a value based upon said electric signal from said sensing means; and a means, electrically connected to said storing means, for displaying said stored value.

13. A device for recording fluid consumption from a drinking container by a person during a predetermined period of time, comprising:
    means for substantially automatically sensing an amount of fluid in a drinking container, and for generating an electric signal based upon said sensing;
    said sensing means being suitably connected to the drinking container;
    means for receiving said electric signal generated by said sensing means and for storing a value which is representative of a cumulative amount of fluid in the drinking container during the predetermined period of time; and means for displaying said stored value.

14. A device as recited in claim 13, wherein:

said sensing means comprises a sensor and a means for comparing said electric signal from said sensing means with a signal representing a substantially standard size serving of fluid.

15. A device as recited in claim 14, wherein: said storing means comprises a counter.

16. A device as recited in claim 15, wherein: said counter is resettable.

17. A device as recited in claim 13, wherein: said display means comprises an electronic display.

* * * * *